United States Patent [19]
Bhattacharyya

[11] Patent Number: 6,071,433
[45] Date of Patent: Jun. 6, 2000

[54] METHOD OF HYDROCARBON REFORMING AND CATALYST PRECURSOR

[75] Inventor: Alakananda Bhattacharyya, Glen Ellyn, Ill.

[73] Assignee: BP Amoco Corporation, Chicago, Ill.

[21] Appl. No.: 09/233,547

[22] Filed: Jan. 20, 1999

Related U.S. Application Data

[63] Continuation-in-part of application No. 08/897,743, Jul. 21, 1997, abandoned.
[51] Int. Cl.[7] .............................. C07C 1/20; C01B 31/18; C01B 3/24
[52] U.S. Cl. ........................ 252/373; 423/418.2; 423/650
[58] Field of Search ............................. 252/373; 423/650, 423/418.2

[56] References Cited

U.S. PATENT DOCUMENTS

| | | | |
|---|---|---|---|
| 3,865,753 | 2/1975 | Broecker et al. | 252/373 |
| 4,865,624 | 9/1989 | Okada | 48/61 |
| 4,911,904 | 3/1990 | Delzer et al. | 423/437 |
| 5,246,899 | 9/1993 | Bhattacharyya | 502/84 |
| 5,354,932 | 10/1994 | Bhattacharyya et al. | 585/400 |
| 5,399,537 | 3/1995 | Bhattacharyya et al. | 502/84 |
| 5,498,370 | 3/1996 | Bhattacharyya et al. | 252/373 |
| 5,614,163 | 3/1997 | Bhattacharyya et al. | 423/418.2 |
| 5,626,794 | 5/1997 | Bhattacharyya et al. | 252/373 |
| 5,653,774 | 8/1997 | Bhattacharyya et al. | 48/198.7 |
| 5,677,364 | 10/1997 | Nosu et al. | 523/200 |
| 5,740,667 | 4/1998 | Bhattacharyya et al. | 252/373 |
| 5,767,040 | 6/1998 | Bhattacharyya et al. | 502/524 |

FOREIGN PATENT DOCUMENTS

| | | |
|---|---|---|
| 0 476 489 A1 | 3/1992 | European Pat. Off. . |
| 2091785 | 1/1972 | France . |
| 195 34 434 C1 | 3/1997 | Germany . |
| 60-257837 | 12/1985 | Japan . |
| WO 94/14700 | 7/1994 | WIPO . |
| WO 94/21376 | 9/1994 | WIPO . |
| WO 96/23611 | 8/1996 | WIPO . |

OTHER PUBLICATIONS

Jiang et al., "Kinetic Mechanism for the Reaction Between Methanol and Water Over a Cu–ZnO–Al$_2$O$_3$ Catalyst," Applied Catalysis A: General, 97 (1993) pp. 145–158.

Jiang et al., "Kinetic Study of Steam Reforming of Methanol Over Copper–Based Catalysts," Applied Catalysis A: General, 93 (1993) pp. 245–255.

Mizuno et al., "Production of Synthesis Gas with Various Compositions of H$_2$, CO, and CO$_2$ From Methanol and Water on a Ni–K/Al$_2$O$_3$ Catalyst," Chemistry Letters (1986) pp. 1969–1972.

Robinson et al., "Structure and Activity in CO/H$_2$O of Cu/Zn/Al$_2$O$_3$ Methanol Synthesis Catalysts," Applied Catalysis, 60 (1990) pp. 61–72.

Takezawa et al., "Steam Reforming of Methanol on Copper–Silica Catalysts; Effect of Copper Loading and Calcination Temperature on the Reaction," Applied Catalysis, 4 (1982) pp. 127–134.

*Primary Examiner*—Gary P. Straub
*Attorney, Agent, or Firm*—Thomas A. Yassen; Robert E. Sloat

[57] ABSTRACT

Hydrotalcite-like clays, catalysts derived therefrom, and methods of hydrocarbon reforming using the catalyst are disclosed. The hydrotalcite-like clays, which may be calcined to form the catalyst, have the formula $[M^{2+}_{(1-x)}M^{3+}_{x}(OH)_2]^{x+}(A^{n-}_{x/n}) \cdot mH_2O$ at an elevated temperature for a time sufficient to decompose A and to dehydrate said compound, wherein $M^{2+}$ comprises at least two species of metal ions having a valence of 2+ selected from the group consisting of $Cu^{2+}$, $Zn^{2+}$, $Ni^{2+}$, and $Mg^{2+}$, provided that if $M^{2+}$ comprises $Mg^{2+}$ at least one of $Zn^{2+}$ and $Ni^{2+}$ is also present, wherein the atomic ratio of the total of $Zn^{2+}$ and $Mg^{2+}$ to the total of $Cu^{2+}$ and $Ni^{2+}$ is up to about 9, inclusive, wherein the total of $Zn^{2+}$ and $Mg^{2+}$ comprises at least about 5 wt. % of said $M^{2+}$ metals; $M^{3+}$ is at least one metal ion having a valence of 3+ selected from the group consisting of $Al^{3+}$, $Fe^{3+}$, $Cr^{3+}$, $La^{3+}$, $Ce^{3+}$, and mixtures thereof; x is a number in the range of about 0.1 to about 0.5, inclusive; A is an anion having a charge of –n; n is an integer in the range of 1 to 6, inclusive; and, m is zero or a positive number.

22 Claims, No Drawings

METHOD OF HYDROCARBON REFORMING AND CATALYST PRECURSOR

CROSS REFERENCE TO RELATED APPLICATION

This is a continuation-in-part of U.S. application Ser. No. 08/897,743 filed Jul. 21, 1997, now abandoned the entire disclosure of which is incorporated by reference.

BACKGROUND OF THE INVENTION

1. Field of the Invention

The invention relates generally to catalysts and catalytic processes for reforming oxygen-containing hydrocarbons and, more specifically, the invention relates to a method of converting oxygen-containing hydrocarbons to useful products using catalysts derived from hydrotalcite-like catalyst precursors.

2. Description of Related Technology

The use of metal-containing catalysts in converting oxygen-containing hydrocarbons to useful products (e.g. methanol reforming the conversion of methanol to carbon dioxide and hydrogen by reaction of methanol and water) is well known. Conventionally, the oxygen-containing hydrocarbon is reacted with excess steam over a catalyst, generally in the form of mixed metal oxides, such as $CuO/ZnO/Al_2O_3$, to produce useful products (e.g., carbon dioxide and hydrogen). The catalysts and processes used for steam reforming of oxygen-containing hydrocarbons, however, have suffered from various disadvantages.

Mixed metal oxide catalysts are readily susceptible to deactivation and, furthermore, the active sites present in mixed metal oxide catalysts tend to deactivate at differing rates, which adversely affects selectivity as well as activity.

Typical methanol reforming (and other) processes of the prior art require excess steam to increase the degree of conversion of the process, which adds greatly to the energy costs of the process. Some prior hydrocarbon conversion catalysts are difficult to prepare and/or exhibit low activity and/or selectivity. Some prior processes require that the hydrocarbon and/or water reactants be supplied to the reactor in gaseous form, which further increases the cost of the process. Further, steam, heat, and time are major factors leading to deactivation of conventional mixed metal oxides due to sintering, which results in the loss of surface area and formation of aggregates.

SUMMARY OF THE INVENTION

It is an object of the invention to overcome one or more of the disadvantages described above.

According to the invention, a method of converting oxygen-containing hydrocarbons using a catalyst derived from a hydrotalcite-like compound (i.e., a hydrotalcite-like clay) is provided. The hydrotalcite-like compound is of the formula $[M^{2+}_{(1-x)}M^{3+}_x(OH)_2]^{x+} (A^{n-}_{x/n}) \cdot mH_2O$ at an elevated temperature for a time sufficient to decompose A and to dehydrate the compound, wherein $M^{2+}$ comprises at least two species of metal ions having a valence of 2+ selected from the group consisting of $Cu^{2+}$, $Zn^{2+}$, $Ni^{2+}$, and $Mg^{2+}$, provided that if $M^{2+}$ comprises $Mg^{2+}$ at least one of $Zn^{2+}$ and $Ni^{2+}$ is also present, wherein the atomic ratio of the total of $Zn^{2+}$ and $Mg^{2+}$ to the total of $Cu^{2+}$ and $Ni^{2+}$ is up to about 9, inclusive, wherein the total of $Zn^{2+}$ and $Mg^{2+}$ comprises at least about 5 wt. % of said $M^{2+}$ metals; $M^{3+}$ is at least one metal ion having a valence of 3+ selected from the group consisting of $Al^{3+}$, $Fe^{3+}$, $Cr^{3+}$, $La^{3+}$, $Ce^{3+}$, and mixtures thereof; x is a number in the range of about 0.1 to about 0.5, inclusive; A is an anion having a charge of -n; n is an integer in the range of 1 to 6, inclusive; and, m is zero or a positive number.

The hydrotalcite-like compound is prepared by coprecipitating selected anionic and cationic species under controlled pH and concentration conditions to form a gel, followed by drying of the gel. The catalyst is formed by calcining the hydrotalcite-like compound.

The invention provides hydrocarbon reforming catalysts and processes wherein the catalysts exhibit excellent activity and selectivity, have long term hydrothermal stability, and are simple and inexpensive to prepare. The invention allows the efficient production of useful products from liquid feeds.

Other objects and advantages of the invention may be apparent to those skilled in the art from a review of the following detailed description taken in conjunction with the appended claims.

DETAILED DESCRIPTION OF THE INVENTION

The catalysts and processes of the invention are broadly applicable to the reforming of a wide variety of oxygen-containing hydrocarbons ("oxygenates") to produce hydrogen and other useful products. Oxygenates that may be reformed to useful products according to the invention include various ethers (e.g., dimethyl ether, diethyl ether, and methyl ethyl ether), alcohols (methanol, ethanol, propanols, and butanols, for example), and $C_2$ to $C_4$ aldehydes and ketones, for example. The invention is especially applicable to methanol reforming, and while the following description refers to methanol reforming as an example of an application of the invention, the scope of the invention is not to be limited by such reference.

While other mechanisms may apply (see, for example, Bhattacharyya U.S. Pat. No. 5,498,370 at cols. 3 and 4, and Jiang et al., *Applied Catal. A: General* 97 (1993) at 145–158 and 245–255), methanol may be reformed by a reaction with water to produce carbon dioxide and hydrogen by two general steps, e.g., by decomposition of methanol to carbon monoxide and hydrogen by the reaction:

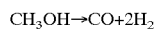

$$CH_3OH \rightarrow CO + 2H_2$$

and by reaction of carbon monoxide and water to form carbon dioxide and hydrogen by the following, so-called "water gas shift" reaction:

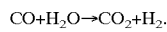

$$CO + H_2O \rightarrow CO_2 + H_2.$$

The overall methanol reforming reaction is thus set forth by the following reaction:

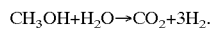

$$CH_3OH + H_2O \rightarrow CO_2 + 3H_2.$$

The overall reaction is endothermic, and in the past has typically utilized excess steam to drive the conversion of carbon monoxide to carbon dioxide and hydrogen in the water gas shift reaction.

According to the invention, ethanol may be reformed to produce hydrogen and acetic acid, by the following mechanism. In the presence of a catalyst of the invention, ethanol is dehydrogenated to produce ethyl acetate and hydrogen, according to the reaction:

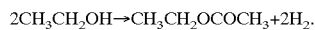

$$2CH_3CH_2OH \rightarrow CH_3CH_2OCOCH_3 + 2H_2.$$

Ethyl acetate is then hydrolyzed to produce acetic acid by the reaction:

$$CH_3CH_2OCOCH_3 + H_2O \rightarrow CH_3CH_2OH + CH_3COOH.$$

The overall ethanol reforming reaction is thus as follows:

$$CH_3CH_2OH + H_2O \rightarrow CH_3COOH + 2H_2.$$

Hence, ethanol and water, in a 1:1 molar ratio, react over a catalyst to produce acetic acid and hydrogen.

The invention provides a highly efficient reaction system wherein a liquid hydrocarbon (e.g., methanol) and water may be fed to a reactor (which operates at an elevated temperature) at a substantially unimolar ratio, if desired. In any event, substantial excesses of expensive steam are not required.

This and other objectives of the invention are provided by the use of a catalyst derived by calcining a hydrotalcite-like compound of the formula $[M^{2+}_{(1-x)}M^{3+}_{x}(OH)_2]^{x+}(A^{n-}_{x/n}) \cdot mH_2O$ at an elevated temperature for a time sufficient to decompose A and to dehydrate said compound, wherein $M^{2+}$ comprises at least two species of metal ions having a valence of 2+ selected from the group consisting of $Cu^{2+}$, $Zn^{2+}$, $Ni^{2+}$, and $Mg^{2+}$, provided that if $M^{2+}$ comprises $Mg^{2+}$ at least one of $Zn^{2+}$ and $Ni^{2+}$ is also present, wherein the atomic ratio of the total of $Zn^{2+}$ and $Mg^{2+}$ to the total of $Cu^{2+}$ and $Ni^{2+}$ is up to about 9, inclusive, and preferably about 0.3 to about 5, inclusive, wherein the total of $Zn^{2+}$ and $Mg^{2+}$ comprises at least about 5 wt. % of said $M^{2+}$ metals; $M^{3+}$ is at least one metal ion having a valence of 3+ selected from the group consisting of $Al^{3+}$, $Fe^{3+}$, $Cr^{3+}$, $La^{3+}$, $Ce^{3+}$, and mixtures thereof; x is a number in the range of about 0.1 to about 0.5, inclusive; and preferably about 0.25 to about 0.4, inclusive, A is an anion having a charge of −n; n is an integer in the range of 1 to 6, inclusive, and, m is zero or a positive number, to provide a catalyst having minimal or no content of free zinc oxide. The hydrotalcite-like compound (sometimes referred to herein as a "clay") is prepared under conditions of controlled pH and controlled ionic concentrations.

Hydrotalcite-like Compound

Generally speaking, a hydrotalcite-like compound of a formula given above may be prepared according to the invention by coprecipitation of anionic and cationic species from a solution of suitable sources thereof under conditions of controlled pH and controlled metallic ion concentrations by procedures such as those known in the art. Coprecipitation creates a gel of the hydrotalcite-material, which may be dried under gentle conditions to provide the hydrotalcite-like compound, which may subsequently be calcined in order to dehydrate the compound and to decompose the anionic species A, to form a catalyst.

As is apparent from the formula of the clay given above, the clay always contains at least two of $Cu^{2+}$, $Ni^{2+}$, $Zn^{2+}$, and, if at least one of $Zn^{2+}$ and $Ni^{2+}$ is also present, $Mg^{2+}$, along with a metal having a valence of 3+ selected from $Al^{3+}$, $Fe^{3+}$, $Cr^{3+}$, $La^{3+}$, $Ce^{3+}$, and mixtures thereof.

Generally, the compound will contain copper and/or nickel plus magnesium and/or zinc. The metals having a valence of 2+ preferably include, in combination, $Cu^{2+}$ and $Zn^{2+}$; $Cu^{2+}$ and $Ni^{2+}$; $Cu^{2+}$, $Ni^{2+}$, and $Zn^{2+}$; $Zn^{2+}$ and $Ni^{2+}$; or $Mg^{2+}$ and $Ni^{2+}$, and in preferred forms consist essentially of or consist of one of these combinations of divalent metal species. In other forms, additional $M^{2+}$ metals such as $Fe^{2+}$, $Cd^{2+}$, and mixtures thereof may be present in the clay. Any of the additional divalent metals may omitted, and in one preferred form the clay is substantially free of magnesium.

The $M^{3+}$ metal present in the clay is selected from the group consisting of $Al^{3+}$, $Fe^{3+}$, $Cr^{3+}$, $La^{3+}$, $Ce^{3+}$, and mixtures thereof, and $Al^{3+}$ is the preferred trivalent metal.

In one form, the trivalent metal consists essentially or consists of $Al^{3+}$ or another $M^{3+}$ metal. It is preferred that $Al^{3+}$ be present and comprise at least 30 wt. % and more preferably at least 40 wt. % of the trivalent metals. In one form, $Al^{3+}$ is present as part of a mixture with at least one of $Fe^{3+}$, $Cr^{3+}$, $La^{3+}$, and $Ce^{3+}$. In one preferred embodiment, the $M^{3+}$ metals comprise $Fe^{3+}$ in mixture with $Al^{3+}$. However, $Al^{3+}$ need not be present; any of the other trivalent metals may be used alone or in combination with any of the others.

The variable "x" may range from about 0.1 to about 0.5, inclusive, and preferably is about 0.25 to about 0.4, inclusive.

In the catalyst of the invention copper and, if present, nickel provides hydrocarbon reforming activity. On the other hand, zinc and, if present, $Cr^{3+}$, $Fe^{3+}$, and $Fe^{3+}$ provide good water gas shift activity. Magnesium also may function to control the acidity or basicity of the catalyst. One or more of cerium, lanthanum, and cadmium may be added to improve the physical properties of the catalyst without interfering with the activities of other metals.

The anionic species A provides structural integrity by forming pillars or linkages between cationic layers of the clay. A is preferably selected from the group consisting of $CO_3^{2-}$, $NO_3^-$, $SO_4^{2-}$, metalates, polyoxometalates, hydroxides, oxides, acetates, halides, organic carboxylates, and polycarboxylates, but carbonate ($CO_3^{2-}$) is highly preferred.

In one preferred form, $M^{2+}$ consists essentially of a mixture of $Cu^{2+}$ and $Zn^{2+}$, $M^{3+}$ consists essentially of $Al^{3+}$, and A consists essentially of $CO_3^{2-}$. Highly preferred forms of the inventive hydrotalcite-like compound are $Cu_3Zn_2Al_2(OH)_{14}CO_3 \cdot mH_2O$, $Cu_2NiZnAl_2(OH)_{12}CO_3 \cdot mH_2O$, $Cu_2Ni_2Al_2(OH)_{12}CO_3 \cdot mH_2O$, $Mg_3NiAl_2(OH)_{12}CO_3 \cdot mH_2O$, $Zn_3NiAl_2(OH)_{12}CO_3 \cdot mH_2O$, $Zn_2Ni_2Al_2(OH)_{12}CO_3 \cdot mH_2O$, and $Cu_2NiZnAl_2(OH)_{12}CO_3 \cdot mH_2O$.

To make the hydrotalcite-like clays of the invention, at least one compound (preferably nitrate, sulfate, or chloride) of the desired $M^{2+}$ metal species is combined in solution with at least one compound containing the desired $M^{3+}$ trivalent metal ion species. The solution containing divalent and trivalent metal cations is then mixed with a solution containing the anionic species $A^{n-}$, preferably slowly over a time period of one to two hour(s). The pH of the resulting solution is adjusted with acid or base such that the anionic species desired to prepare the hydrotalcite is stable in the solution. The pH adjustment preferably is made in order to keep the pH at 11 or less, most preferably at 10 or less, such that the hydrotalcite-like compounds are formed with minimal or no formation of free zinc oxide (ZnO) or other divalent metal oxide(s), which have an adverse effect on the performance of the eventual catalyst in oxygen-containing hydrocarbon reforming.

It may also be desirable to control the concentrations of the divalent and trivalent metals, as too high a metal concentration prevents efficient formation of cationic layers in the clay. Thus, according to the invention, the total divalent and trivalent metal concentration in the gel preferably should be maintained at 0.5 moles/liter or less, especially when $Zn^{2+}$ is present.

The lower limits of metals concentrations are dictated only by economic considerations. Preferably, the pH of the solution preferably should be maintained at 5 or greater, and highly preferably 7 or greater.

pH control and metals concentration control are especially important if $Zn^{2+}$ is present, as the tendency to form free metal oxide (ZnO, in this case) is relatively great with zinc as compared to other useful metals. The need to control pH and concentration varies directly with the $Zn^{2+}$ concentration.

Preferably, respective solutions of the anionic and cationic species are mixed together under the foregoing conditions to produce a gel. The hydrotalcite-like compound may then be readily obtained by gently drying the gel at 100° C. or less, for example.

The Catalyst

The catalyst of the invention is formed by dehydrating the hydrotalcite-like compound and decomposing the anionic species A, as by calcining. Calcining is carried out at a sufficiently high temperature and for a period of time sufficient to carry out dehydration, and anionic species decomposition. Generally, calcining may be carried out at a temperature in the range about 250° C. to about 700° C., inclusive, but calcining is preferably carried out at a temperature of at least 300° C., highly preferably at about 400° C. to about 550° C., inclusive, and most preferably at a temperature of about 450° C. Activity of the catalyst will be adversely affected by calcining at too low a temperature, as dehydration may not be complete, and undesired structural changes occur at temperatures over 700° C. Reforming activity for oxygenated hydrocarbon feeds is optimized by calcining in the range of 400° C. to 550° C.

Calcining can be carried out under reducing or non-reducing conditions, but it is preferred to calcine the clay under a flow of air or nitrogen. The time necessary for calcining varies inversely with the calcining temperature, but the calcining time is not critical.

Preparation of the hydrotalcite-like compounds of the invention under the conditions described above generally results in the formation of hydrotalcite-like compounds having ZnO and other divalent metal oxide contents of less than about 1 wt. %, as determined by x-ray diffraction. Substantial contents of ZnO and other divalent metal oxide impurities have a negative effect on the performance of the catalyst prepared from the hydrotalcite-compound.

Preferably, the catalyst comprises $Cu^{2+}$ and/or $Ni^{2+}$ plus $Zn^{2+}$ and/or $Mg^{2+}$, optionally with at least one additional metal having a valence of 2+, wherein the divalent copper, nickel, zinc, and magnesium species together comprise at least about 10 wt. % of the divalent metals. Highly preferably, divalent copper, nickel, zinc, and magnesium together comprise about 15 wt. % to about 70 wt. % of the divalent metals, and highly preferably the copper, nickel, zinc, and magnesium comprise at least about 30 wt. % of the divalent metals in the catalyst. If desired, copper, nickel, zinc, and magnesium may together form 100 wt. % of the divalent metals in the catalyst.

It is desirable in some cases that the trivalent metals include trivalent iron or another trivalent metal in addition to the preferred trivalent aluminum.

It is difficult to derive a universal idealized formula for the catalyst of the invention, but preferred hydrotalcite-like compounds $Cu_3Zn_2Al_2(OH)_{14}CO_3 \cdot mH_2O$, $Cu_2NiZnAl_2(OH)_{12}CO_3 \cdot mH_2O$, $Cu_2Ni_2Al_2(OH)_{12}CO_3 \cdot mH_2O$, $Mg_3NiAl_2(OH)_{12}CO_3 \cdot mH_2O$, $Zn_3NiAl_2(OH)_{12}CO_3 \cdot mH_2O$, $Zn_2Ni_2Al_2(OH)_{12}CO_3 \cdot mH_2O$, and $Cu_2NiZnAl_2(OH)_{12}CO_3 \cdot mH_2O$, when calcined, produce preferred catalysts of the formulae $Cu_3Zn_2Al_2O_8$, $Cu_2NiZnAl_2O_7$, $Cu_2Ni_2Al_2O_7$, $Mg_3NiAl_2O_7$, $Zn_3NiAl_2O_7$, $Zn_2Ni_2Al_2O_7$, and $Cu_2NiZnAl_2O_7$, respectively.

The skilled artisan can readily prepare catalysts of the desired idealized formulations by preparing hydrotalcite-like compounds having atomic ratios of metals that correspond to the idealized formulae of the catalysts themselves.

Process Conditions

The oxygen-containing hydrocarbon reforming method of the invention is remarkably simple to carry out with high efficiency. In general terms, the hydrocarbon (e.g., methanol) and water are provided to a reactor, preferably in liquid form, to be passed in gaseous form at an elevated temperature over a catalyst bed. For example, a catalyst bed may be formed in a tubular reactor maintained at 300° C. or less at any desired pressure, generally in the range of about one to about 100 atm., and preferably in the range of about five atm. to 25 atm. It is not necessary to operate at elevated pressure, but operation in the range of about five atm. to about 25 atm. may avoid the need for subsequent compression of products for downstream processes.

Other types of heterogeneous reactors may be used, as known in the art.

In methanol reforming applications, the reactor is typically operated at a temperature in the range of about 200° C. to about 300° C. (Larger alcohols or other hydrocarbons may require higher reaction temperatures.) Since the reactor is endothermic in nature, heat may be provided to the reactor to maintain the reaction temperature. The degree of conversion is directly related to the reaction temperature, and the use of lower reaction temperature with recycle may be desirable. It has been found that the catalyst of the invention allows virtually complete conversion of methanol to carbon dioxide and hydrogen products.

The hydrocarbon and water reactants may be provided to the reactor, in liquid form, in any desired ratio; for methanol reforming, a molar $H_2O:CH_3OH$ range of about 0.5 to about 2 is generally used, although a unimolar ratio is highly preferred. The gaseous hydrocarbon and water may be carried in a diluent, such as a nitrogen stream, which provides a homogenous reaction mixture, and assists in controlling the reaction temperature and thus the reaction rate. The catalyst need not be diluted, supported, or pelletized.

The product streams produced according to the invention will contain substantial quantities of molecular hydrogen and other useful product(s) (e.g. carbon dioxide or acetic acid), any of which can be recovered for end-use applications, or for further processing. Hydrogen produced according to the invention is especially suitable for use as a fuel or fuel additive for relatively clean power generation.

Since the reaction is endothermic, waste heat from any process can be advantageously recovered for use in this process.

EXAMPLES

The practice in the invention is illustrated by the following detailed examples, which are not intended to be limiting.

Example 1

Preparation of $Cu_3Zn_2Al_2(OH)_{14}CO_3 \cdot 4H_2O$

Each of $Cu(NO_3)_2 \cdot 6H_2O$ (72.47 g, 0.3 mole), $Zn(NO_3)_2 \cdot 6H_2O$ (52.40g, 0.2 mole) and $Al_2(NO_3)_3 \cdot 9H_2O$ (75.02 g, 0.2 mole) was dissolved in a 1,000 ml aliquot of distilled water to form a cationic solution, and placed into an addition funnel.

An anionic solution was prepared by dissolving NaOH (56.00 g, 1.4 moles) and $Na_2CO_3$ (15.98 g, 0.15 mole 50% molar excess in order to ensure pillaring) in 1,200 ml distilled water. The solution was placed into a round bottom three-neck flask.

The cationic solution was added to the anionic solution, with stirring, over a two hour period. Upon completion of addition, the pH was measured at 10.6, and was then adjusted to 8.25 using nitric acid ($HNO_3$). After adjustment of the pH, the slurry was heated to 85° C. and maintained at that temperature overnight, with stirring, under a nitrogen purge/sweep.

The precipitated gel-like material was filtered and then washed three times with distilled water. Two liters of distilled water were used per wash.

The resulting material was then oven-dried at 70° C. overnight under 22 inches of vacuum. The dry weight of the resulting hydrotalcite product was 57.89 grams.

The reactor was purged with 33 std. cc/min of $N_2$ until the interior temperature reached 240° C. At 240° C., the feed solution was added at a rate of 4.964 cc/hr (0.0827 cc/min). The molar proportions of methanol, water, and nitrogen ($N_2$) charged to the reactor were about 1:1:1. The gas hourly space velocity (GHSV) of the feed was 2000, while the GHSV of the feed and nitrogen carrier was 3000.

The product stream flowing from the reactor was analyzed, and the results are shown in the table, below.

| | $Cu_3Zn_2Al_2O_8$ Methanol Reforming Catalyst | | | | | | | | |
|---|---|---|---|---|---|---|---|---|---|
| Day | 1 | 1 | 2 | 3 | 3 | 3 | 3 | 4 | 5 |
| Time: | 13:47 | 18:13 | 6:12 | 7:04 | 9:27 | 12:14 | 19:26 | 6:09 | 6:10 |
| Temp. (° C.) | | | | | | | | | |
| Exterior | 261 | 261 | 261 | 261 | 286 | 286 | 286 | 286 | 286 |
| Interior | 238 | 240 | 240 | 238 | 257 | 258 | 259 | 259 | 258 |
| Product (mole %) | | | | | | | | | |
| $H_2$ | 56.757 | 56.424 | 56.184 | 55.843 | 59.637 | 58.86 | 59.267 | 59.363 | 58.856 |
| $N_2$ | 22.308 | 22.745 | 23.335 | 23.913 | 19.606 | 20.205 | 20.155 | 20.101 | 20.2 |
| CO | 0.808 | 1.11 | 0.944 | 0.5 | 0.746 | 1.309 | 0.831 | 0.705 | 0.786 |
| $CH_4$ | 0.0543 | 0.0667 | 0.0441 | 0.0204 | 0 | 0 | 0 | 0 | 0.0227 |
| $CO_2$ | 18.165 | 17.947 | 17.72 | 17.587 | 18.473 | 18.237 | 18.415 | 18.43 | 18.349 |
| C2s | 0 | 0 | 0 | 0 | 0 | 0 | 0 | 0 | 0 |
| $H_2O$ | 0.537 | 0.557 | 0.438 | 0.432 | 0.457 | 0.422 | 0.523 | 0.56 | 0.638 |
| C3s | 0 | 0 | 0 | 0 | 0 | 0 | 0 | 0 | 0 |
| DME | 0 | 0 | 0 | 0 | 0 | 0 | 0 | 0 | 0 |
| $CH_3OH$ | 1.372 | 1.149 | 1.335 | 1.705 | 1.081 | 0.966 | 0.808 | 0.841 | 1.149 |
| Mole Ratio | | | | | | | | | |
| $H_2/CO_2$ | 3.12 | 3.14 | 3.17 | 3.18 | 3.23 | 3.23 | 3.22 | 3.22 | 3.21 |
| $H_2/(CO + CO_2)$ | 2.99 | 2.96 | 3.01 | 3.09 | 3.10 | 3.01 | 3.08 | 3.10 | 3.08 |
| $H_2$/(total carbon) | 2.98 | 2.95 | 3.00 | 3.08 | 3.10 | 3.01 | 3.08 | 3.10 | 3.07 |
| Conversion (%) | | | | | | | | | |
| MeOH | 97.24 | 97.69 | 97.32 | 96.58 | 97.83 | 98.06 | 98.38 | 98.31 | 97.69 |
| Selectivity (%) | | | | | | | | | |
| $H_2$ | 99.81 | 99.76 | 99.93 | 100.00 | 100.00 | 100.00 | 100.00 | 100.00 | 99.92 |
| CO | 4.25 | 5.80 | 5.05 | 2.76 | 3.88 | 6.70 | 4.32 | 3.68 | 4.10 |
| $CH_4$ | 0.29 | 0.35 | 0.24 | 0.11 | 0.00 | 0.00 | 0.00 | 0.00 | 0.12 |
| $CO_2$ | 95.47 | 93.85 | 94.72 | 97.13 | 96.12 | 93.30 | 95.68 | 96.32 | 95.78 |

Preparation of $Cu_3Zn_2Al_2O_8$ Catalyst

The dried hydrotalcite compound prepared as described above was calcined by placing the product in a furnace at room temperature, heating at a rate of 3° C./minute to a temperature of 550° C., and holding the product at 550° C. for four hours. The product was cooled and the resulting $Cu_3Zn_2Al_2O_8$ catalyst was sieved to 40/60 mesh, to provide a catalyst having an apparent bulk density of 0.65 g/cc.

Methanol Reforming

The $Cu_3Zn_2Al_2O_8$ catalyst prepared as described above was tested for methanol reforming activity in a 9 mm×11 mm×30 inch quartz tubular reactor. The catalyst bed length was 1.5 inches (volume 2.0 cc) and the catalyst was not diluted. The catalyst was flanked by a ½ inch α-alumina (30/50 mesh) preheat zone and a ¼ inch α-alumina (30/50 mesh) post heat zone.

A thermocouple located at or near the midpoint of the bed was utilized as a control point for determining when the reactor temperature had stabilized.

Example 2

Preparation of $Cu_2Ni_2Al_2(OH)_{12}CO_3 \cdot xH_2O$

Each of $Cu(NO_3)_2 \cdot 6H_2O$ (17.44 g, 0.075 mole), $Ni(NO_3)_2 \cdot 6H_2O$ (21.81 g, 0.075 mole), and $Al(NO_3)_3 \cdot 9H_2O$ (28.14 g, 0.075 mole) was dissolved in a 350 mL aliquot of distilled water to form a cationic solution, and placed in an addition funnel.

An anionic solution was prepared by dissolving NaOH (18.00 g, 0.45 mole) and $Na_2CO_3$ (7.93 g, 0.075 mole) (one equivalent excess in order to ensure pillaring) in 400 mL of distilled water. The resulting solution was placed in a round bottom three-neck flask.

The cationic solution as added to the anionic solution, while stirring, over a two hour period. Upon completion of addition, the pH was measured at about 10, and was then adjusted to 8.66 using nitric acid ($HNO_3$). After adjustment of the pH, the slurry was heated to 85° C. and maintained at that temperature overnight, with stirring, under a nitrogen purge/sweep.

The precipitated gel-like material was filtered, and washed with distilled water three times. About one liter of distilled water was used per wash. The resulting gel was then oven-dried at 70° C. overnight under 22 inches (Hg) of vacuum. The dry weight of the resulting hydrotalcite product was 21.79 g.

Preparation of $Cu_2Ni_2Al_2O_7$

The dried hydrotalcite compound prepared as described above was calcined by placing the product in a furnace at room temperature, heating at a rate of 3° C./min. to a temperature of 450° C., and holding the product at that temperature for three hours to produce $Cu_2Ni_2Al_2O_7$ catalyst.

Example 3

Preparation of $Mg_3NiAl_2(OH)_{12}CO_3.xH_2O$

Each of $Mg(NO_3)_2.6H_2O$ (28.85 g, 0.1125 mole), $Ni(NO_3)_2.6H_2O$ (10.91 g, 0.0375 mole), and $Al(NO_3)_3.9H_2O$ (28.14 g, 0.075 mole) was dissolved in a 350 mL aliquot of distilled water to form a cationic solution, and placed in an addition funnel.

An anionic solution was prepared by dissolving NaOH (18.00 g, 0.45 mole) and $Na_2CO_3$ (7.93 g, 0.075 mole) (one equivalent excess in order to ensure pillaring) in 400 mL of distilled water. The resulting solution was placed in a round bottom three-neck flask.

The cationic solution was added to the anionic solution, while stirring, over a two hour period. Upon completion of addition, the pH was adjusted to 9.0 using nitric acid ($HNO_3$). After adjustment of the pH, the slurry was heated to 85° C. and maintained at that temperature overnight, with stirring, under a nitrogen purge/sweep.

The precipitated gel-like material was filtered, and washed with distilled water three times. About one liter of distilled water was used per wash. The resulting gel was then oven-dried at 70° C. overnight under 22 inches (Hg) of vacuum. The dry weight of the resulting hydrotalcite products was 18.25 g.

Preparation of $Mg_3NiAl_2O_7$

The dried hydrotalcite compound prepared as described above was calcined by placing the product in a furnace at room temperature, heating at a rate of 30° C./min. to a temperature of 450° C., and holding the product at that temperature for three hours to produce $Mg_3NiAl_2O_7$ catalyst.

Example 4

Preparation of $Zn_3NiAl_2(OH)_{12}CO_3.H_2O$

Each of $Zn(NO_3)_2.6H_2O$ (29.41 g, 0.1125 mole), $Ni(NO_3)_2.6H_2O$ (10.91 g, 0.0375 mole), and $Al(NO_3)_3.9H_2O$ (28.14 g, 0.075 mole) was dissolved in a 350 mL aliquot of distilled water to form a cationic solution, and placed in an addition funnel.

An anionic solution was prepared by dissolving NaOH (18.00 g, 0.45 mole) and $Na_2CO_3$ (7.93 g, 0.075 mole) (one equivalent excess in order to ensure pillaring) in 400 mL of distilled water. The resulting solution was placed in a round bottom three-neck flask.

The cationic solution was added to the anionic solution, while stirring, over a two hour period. Upon completion of addition, the pH was adjusted to 8.3 using nitric acid ($HNO_3$). After adjustment of the pH, the slurry was heated to 88° C. and maintained at that temperature overnight, with stirring, under a nitrogen purge/sweep.

The precipitated gel-like material was filtered, and washed with distilled water three times. About one liter of distilled water was used per wash. The resulting gel was then oven-dried at 70° C. overnight under 22 inches (Hg) of vacuum. The dry weight of the resulting hydrotalcite product was 24.25 g.

Preparation of $Zn_3NiAl_2O_7$

The dried hydrotalcite compound prepared as described above was calcined by placing the product in a furnace at room temperature, heating at a rate of 3° C./min. to a temperature of 450° C., and holding the product at that temperature for three hours to produce $Zn_3NiAl_2O_7$ catalyst.

Example 5

Preparation of $Zn_2Ni_2Al_2(OH)_{12}CO_3.xH_2O$

Each of $Zn(NO_3)_2.6H_2O$ (22.31 g, 0.075 mole), $Ni(NO_3)_2.6H_2O$ (21.81 g, 0.075 mole), and $Al(NO_3)_3.9H_2O$ (28.14 g, 0.075 mole) is dissolved in a 350 mL aliquot of distilled water to form a cationic solution, and placed in an addition funnel.

An anionic solution is prepared by dissolving NaOH (18.00 g, 0.45 mole) and $Na_2CO_3$ (7.93 g, 0.075 mole) (one equivalent excess in order to ensure pillaring) in 400 mL of distilled water. The resulting solution is placed in a round bottom three-neck flask.

The cationic solution is added to the anionic solution, while stirring, over a two hour period. Upon completion of addition, the pH is measured at about 10, and is then adjusted to 8.5 using the nitric acid ($HNO_3$). After adjustment of the pH, the slurry is heated to 85° C. and maintained at that temperature overnight, with stirring, under a nitrogen purge/sweep.

The precipitated gel-like material is filtered, and washed with distilled water three times. About one liter of distilled water is used per wash. The resulting gel is then oven-dried at 70° C. overnight under 22 inches (Hg) of vacuum. The dry weight of the resulting hydrotalcite product is about 22 g.

Preparation of $Zn_2Ni_2Al_2O_7$

The dried hydrotalcite compound prepared as described above is calcined by placing the product in a furnace at room temperature, heating at a rate of 3° C./min. to a temperature of 450° C., and holding the product at that temperature for three hours to produce $Zn_2Ni_2Al_2O_7$ catalyst.

Example 6

Preparation of $Cu_2NiZnAl_2(OH)_{12}CO_3.xH_2O$

Each of $Cu(NO_3)_2.6H_2O$ (17.44 g, 0.075 mole), $Ni(NO_3)_2.6H_2O$ (10.9 g, 0.0375 mole), $Zn(NO_3)_2.6H_2O$ (11.15 g, 0.0375 mole), and $Al(NO_3)_3.9H_2O$ (28.14 g, 0.075 mole) is dissolved in a 350 mL aliquot of distilled water to form a cationic solution, and placed in an addition funnel.

An anionic solution is prepared by dissolving NaOH (18.00 g, 0.45 mole) and $Na_2CO_3$ (7.93 g, 0.075 mole) (one equivalent excess in order to ensure pillaring) in 400 mL of distilled water. The resulting solution is placed in a round bottom three-neck flask.

The cationic solution is added to the anionic solution, while stirring, over a two hour period. Upon completion of addition, the pH is measured at about 10, and is then adjusted to about 8.5 using nitric acid ($HNO_3$). After adjustment of the pH, the slurry is heated to 85° C. and maintained at that temperature overnight, with stirring, under a nitrogen purge/sweep.

The precipitated gel-like material is filtered, and washed with distilled water three times. About one liter of distilled water is used per wash. The resulting gel is the oven-dried at 70° C. overnight under 22 inches (Hg) of vacuum. The dry weight of the resulting hydrotalcite product is about 22 g.

Preparation of $Cu_2NiZnAl_2O_7$

The dried hydrotalcite compound prepared as described above is calcined by placing the product in a furnace at room temperature, heating at a rate of 3° C./min. to a temperature of 450° C., and holding the product at that temperature for three hours to produce $Cu_2NiZnAl_2O_7$ catalyst.

The foregoing detailed description is given for clearness of understanding only, and no unnecessary limitations should be understood therefrom, as modifications within the scope of the invention may become apparent to those skilled in the art.

I claim:

1. A method of reforming an oxygen-containing hydrocarbon selected from the group consisting of ethers, alcohols, $C_2$–$C_4$ aldehydes, and $C_2$–$C_4$ ketones, said method comprising the step of passing a feed stream comprising said hydrocarbon and water over a catalyst under reforming conditions including a reforming temperature of about 300° C. or less wherein said hydrocarbon is reformed, said catalyst being formed by (a) providing a hydrotalcite-like compound of the formula $[M^{2+}_{(1-x)}M^{3+x}(OH)_2]^{x+}(A^{n-}_{x/n}) \cdot mH_2O$, wherein $M^{2+}$ comprises at least two species of metal ions having a valence of 2+ selected from the group consisting of $Cu^{2+}$, $Zn^{2+}$, $Ni^{2+}$, and $Mg^{2+}$, provided that if $M^{2+}$ comprises $Mg^{2+}$ at least one of $Zn^{2+}$ and $Ni^{2+}$ is also present, wherein the atomic ratio of the total of $Zn^{2+}$ and $Mg^{2+}$ to the total of $Cu^{2+}$ and $Ni^{2+}$ is up to about 9, inclusive, and wherein the total of $Zn^{2+}$ and $Mg^{2+}$ comprises at least about 5 wt. % of said $M^{2+}$ metals;

$M^{3+}$ comprises at least one metal ion having a valence of 3+ selected from the group consisting of $Al^{3+}$, $Fe^{3+}$, $Cr^{3+}$, $La^{3+}$, $Ce^{3+}$, and mixtures thereof;

x is a number in the range of about 0.1 to about 0.5, inclusive;

A is an anion having a charge of –n and is decomposable at a temperature of 550° C. or less;

n is an integer in the range of 1 to 6, inclusive; and, m is zero or a positive number, and (b) heating said compound at a temperature of 550° C. or less for a time sufficient to decompose A and to dehydrate said compound to form said catalyst.

2. The method of claim 1 comprising the step of heating said hydrotalcite-like compound at a temperature of about 400° C. to about 550° C., inclusive.

3. The method of claim 1 wherein $M^{2+}$ comprises a mixture of $Cu^{2+}$ and $Zn^{2+}$ with at least one additional metal species of ions having a valence of 2+.

4. The method of claim 3 wherein said additional species of metal ions having a valence of 2+ is selected from the group consisting of $Mg^{2+}$, $Fe^{2+}$, $Ni^{2+}$, $Cd^{2+}$, and mixtures thereof.

5. The method of claim 1 wherein $M^{2+}$ consists essentially of $Cu^{2+}$ and $Zn^{2+}$.

6. The method of claim 1 wherein said compound is substantially free of magnesium.

7. The method of claim 1 wherein $M^{2+}$ comprises $Zn^{2+}$ and said compound is formed by coprecipitating said compound from an aqueous solution containing said ions $M^{2+}$, $M^{3+}$, and $A^{n-}$ at a pH of 11 or less and a total concentration of $M^{2+}$ and $M^{3+}$ of 0.5 moles per liter or less to form a gel, and drying said gel to form said compound.

8. The method of claim 1 wherein $Al^{3+}$ comprises about 30 wt. % to about 100 wt. % of said $M^{3+}$ metals.

9. The method of claim 8 wherein $Al^{3+}$ comprises at least about 40 wt. % of said $M^{3+}$ metals.

10. The method of claim 1 wherein $M^{3+}$ consists essentially of $Al^{3+}$.

11. The method of claim 1 wherein $M^{3+}$ comprises a mixture of $Al^{3+}$ and at least one member selected from the group consisting of $Fe^{3+}$, $Cr^{3+}$, $La^{3+}$, and $Ce^{3+}$.

12. The method of claim 11 wherein $M^{3+}$ comprises $Fe^{3+}$ in addition to said $Al^{3+}$.

13. The method of claim 1 wherein the atomic ratio of the total of $Zn^{2+}$ and $Mg^{2+}$ to the total of $Cu^{2+}$ and $Ni^{2+}$ is in the range of about 0.3 to about 5, inclusive.

14. The method of claim 1 wherein x is a number in the range of about 0.25 to about 0.4, inclusive.

15. The method of claim 1 wherein A is selected from the group consisting of $CO_3^{2-}$, $NO_3^-$, $SO_4^{2-}$, metalates, polyoxometalates, hydroxides, oxides, acetates, halides, organic carboxylates, and polycarboxylates.

16. The method of claim 15 wherein A is $CO_3^{2-}$.

17. The method of claim 1 wherein said $M^{2+}$ consists essentially of $Cu^{2+}$ and $Zn^{2+}$, said $M^{3+}$ consists essentially of $Al^{3+}$, and A consists essentially of $CO_3^{2-}$.

18. The compound of claim 1 wherein said compound is selected from the group consisting of $Cu_3Zn_2Al_2(OH)_{14}CO_3 \cdot mH_2O$, $Cu_2NiZnAl_2(OH)_{12}CO_3 \cdot mH_2O$, $Cu_2Ni_2Al_2(OH)_{12}CO_3 \cdot mH_2O$, $Mg_3NiAl_2(OH)_{12}CO_3 \cdot mH_2O$, $Zn_3NiAl_2(OH)_{12}CO_3 \cdot mH_2O$, $Zn_2Ni_2Al_2(OH)_{12}CO_3 \cdot mH_2O$, and $Cu_2NiZnAl_2(OH)_{12}CO_3 \cdot mH_2O$.

19. The method of claim 1 wherein said catalyst is selected from the group consisting of $Cu_3Zn_2Al_2O_8$, $Cu_2NiZnAl_2O_7$, $Cu_2Ni_2Al_2O_7$, $Mg_3NiAl_2O_7$, $Zn_3NiAl_2O_7$, $Zn_2Ni_2Al_2O_7$, and $Cu_2NiZnAl_2O_7$.

20. The method of claim 1 wherein said hydrocarbon is selected from the group consisting of dimethyl ether, diethyl ether, methyl ethyl ether, methanol, ethanol, propanols, and butanols.

21. The method of claim 1 wherein said hydrocarbon is methanol.

22. The method of claim 1 wherein said hydrocarbon is ethanol.

* * * * *

UNITED STATES PATENT AND TRADEMARK OFFICE
CERTIFICATE OF CORRECTION

PATENT NO.   : 6,071,433
DATED        : June 6, 2000
INVENTOR(S)  : Alakananda Bhattacharyya It is certified that error appears in the above-identified patent and that said Letters Patent is hereby corrected as shown below:

Column 1,
Line 6, "of" U.S. application" should read -- of copending U.S. application --
Line 7, "1997, now abandoned the entire disclosure" should read -- 1997, the entire disclosure --

Column 4,
Line 19, "$Cr^{3+}$, $Fe^{3+}$, and $Fe^{3+}$" should read -- $Cr^{3+}$, $Fe^{2+}$, and $Fe^{3+}$ --

Column 9,
Line 39, "30°c/min. to a" should read -- 3°c/min. to a --

Column 11,
Line 18 "$[M^{2+}_{(1-x)}M^{3+x}(OH)_2]^{x+}$" should read -- $[M^{2+}_{(1-x)}M^{3+}x(OH)_2]^{x+}$ --

Column 12,
Line 35, "$(OH)_{12}CO_3 \cdot mH_2O$," should read -- $(OH)_{12}CO_3 \cdot mH_2O$, --

Signed and Sealed this

Eighteenth Day of September, 2001

*Attest:*

NICHOLAS P. GODICI
*Attesting Officer*   *Acting Director of the United States Patent and Trademark Office*